(12) United States Patent
Kim et al.

(10) Patent No.: US 7,158,323 B2
(45) Date of Patent: Jan. 2, 2007

(54) APPARATUS FOR SWITCHING OPTICAL LOW PASS FILTERS FOR USE IN OPTICAL INSTRUMENT

(75) Inventors: Hak-je Kim, Suwon-si (KR); Jun-kyu Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/947,438

(22) Filed: Sep. 23, 2004

(65) Prior Publication Data

US 2005/0141117 A1 Jun. 30, 2005

(30) Foreign Application Priority Data

Dec. 29, 2003 (KR) ............... 10-2003-0098719

(51) Int. Cl.
*G02B 5/22* (2006.01)
*G02B 7/00* (2006.01)

(52) U.S. Cl. ............... 359/892; 359/885; 359/889; 359/353; 348/235; 348/270; 348/342; 396/275

(58) Field of Classification Search .......... 359/885, 359/889, 892, 353; 348/143, 216.1, 224.1, 348/235, 270, 342, 173; 396/209, 241, 275
See application file for complete search history.

(56) References Cited

U.S. PATENT DOCUMENTS

| 4,041,308 | A | * | 8/1977 | Fujita ................. 250/226 |
| 4,396,288 | A | * | 8/1983 | Helphrey ................. 356/326 |
| 4,600,976 | A | * | 7/1986 | Callahan ................. 362/277 |
| 4,646,140 | A | | 2/1987 | Bailey et al. ............. 358/50 |
| 4,695,878 | A | * | 9/1987 | Levine et al. ............. 348/216.1 |
| 4,862,253 | A | * | 8/1989 | English et al. ............. 348/269 |
| 5,001,556 | A | | 3/1991 | Nakamura et al. |
| 5,046,162 | A | * | 9/1991 | Ishikawa et al. ............. 348/270 |
| 5,331,361 | A | * | 7/1994 | Jones ................. 396/182 |
| 6,153,873 | A | * | 11/2000 | Wolf ................. 250/208.1 |
| 6,340,252 | B1 | | 1/2002 | Kawano |
| 6,817,788 | B1 | * | 11/2004 | Negishi et al. ............. 396/505 |
| 2004/0227626 | A1 | * | 11/2004 | Almaraz et al. ......... 340/457.1 |
| 2004/0258405 | A1 | * | 12/2004 | Shiratori et al. ............ 396/458 |

FOREIGN PATENT DOCUMENTS

| EP | 1 130 457 A | 9/2001 |
| JP | 61-011731 | 1/1986 |

(Continued)

*Primary Examiner*—Leonidas Boutsikaris
(74) *Attorney, Agent, or Firm*—Roylance, Abrams, Berdo & Goodman, L.L.P.

(57) ABSTRACT

Disclosed is an optical filter switching apparatus used in an optical instrument for converting externally input image information into video image information and outputting the video image information. The apparatus comprises: an optical filter holding section holding a first optical filter and a second optical filter; an actuator having a rotary solenoid which rotates between a first position and a second position. A rotational power transmission section transmits the rotational force of the rotary solenoid to the optical filter holding section; and a microprocessor controls the rotary solenoid of the actuator in accordance with at least one external input signal and the power level of the video image information. The rotary solenoid is rotated to at least one of the first and second positions. The optical filter switching apparatus directly drives the optical filter holding section using an actuator provided with a rotary solenoid, whereby the optical filter holding section is switched to a first or second optical filter setting position.

13 Claims, 12 Drawing Sheets

FOREIGN PATENT DOCUMENTS

| | | |
|---|---|---|
| JP | 01-120971 | 5/1989 |
| JP | 2001-075140 | 3/2001 |
| JP | 2002-135788 | 5/2002 |
| KR | 2003-0036484 | 5/2003 |

* cited by examiner

APPARATUS FOR SWITCHING OPTICAL LOW PASS FILTERS FOR USE IN OPTICAL INSTRUMENT

CROSS-REFERENCE TO RELATED APPLICATIONS

This application claims the benefit under 35 U.S.C. §119 (a) of Korean Patent Application No. 2003-98719, filed on Dec. 29, 2003, in the Korean Intellectual Property Office, the entire disclosure of which is incorporated herein by reference.

BACKGROUND OF THE INVENTION

1. Field of the Invention

The present invention relates to an optical filter switching apparatus for switching optical filters for use in an optical instrument such as a closed circuit television (CCTV) camera. In particular, the present invention is directed to an optical filter switching apparatus for switching optical low pass filters (OLPFs) in an optical instrument as the illumination changes from daytime to nighttime and vice versa.

2. Description of the Related Art

Surveillance cameras such as CCTV cameras are photographic apparatuses for taking pictures of a specific place or an object remote from the camera and sending the pictures to a CCTV or a monitoring system, thereby allowing a person to confirm the safety or condition of the object or area under surveillance without going to the remote location. The use of surveillance cameras is diversified; such surveillance cameras are used not only for maintenance of public security and prevention of crime in buildings, parking places, apartment complexes, etc. but also as vehicular security devices.

In general, surveillance cameras are classified into three categories: color camera, black and white (B/W) camera, and color and black-white camera depending on color reproducibility.

Color and black-white cameras typically reproduce a color video image using the surrounding light intensity at daytime when the light intensity is usually sufficient without using separate illumination. Meanwhile they reproduce a black and white video image using a plurality of infrared rays light emitting diodes (IR LEDs) for irradiating infrared rays from opposite sides of a lens toward the front to replenish the light intensity of the lens in a dark place where an object is hardly recognizable to the human eye or at nighttime.

Therefore, color and black-white cameras use the visible wavelength band (for example, 400 nm to 700 nm) in daytime to take advantage of the human visual system, while they use an infrared wavelength (for example, 900 nm) at nighttime. However, image pickup devices of CCD (Charge-Coupled Device) or CMOS (Complementary Metal Oxide Semiconductor) type, which are employed as photoelectric conversion sensors that convert light into an electric signal in the color and black-white cameras, use only one wavelength regardless of daytime or nighttime. During the daytime both the visible and infrared rays are input through the lens causing a focus distortion. The focus distortion results from a variation in the focusing distance due to the difference in the wavelength between visible and infrared rays.

In order to prevent the focus distortion, conventional color and black-white cameras are provided with a daytime optical filter for filtering out infrared rays and transmitting visible rays only. Color and black-white cameras also have a nighttime optical filter for transmitting infrared rays only to the front of the image pickup device. Therefore, the filters can be switched with one another whenever day and night change.

FIGS. 1 and 2 illustrate a conventional color and black-white surveillance camera 1, which employs an optical filter switching apparatus 10.

The color and black-white surveillance camera 1, has a lens 50, an optical filter switching apparatus 10, an image pickup device 60 and a video image signal processing section 70.

The optical filter switching apparatus 10 comprises an optical filter switching assembly 20, a drive control section 45, a microprocessor 47, and a memory 49.

Referring to FIG. 2, the optical filter switching assembly 20 comprises: a front plate 40 located to the side of the lens 50 (not shown), and an optical filter holding section 21 movably mounted on the front plate. The optical filter holding section 21 further comprises a daytime optical filter 30 and a nighttime optical filter 29. The optical filter transfer section 28 of the optical filter switching assembly 20 transfers the optical filter holding section 21 left and right so as to move the daytime optical filter 30 and the nighttime optical filter 29 between a daytime optical filter setting position (FIG. 3A) and a nighttime optical filter setting position (FIG. 3B). When the daytime optical filter 30 and the nighttime optical filter 29 are positioned in the positions shown in FIGS. 3A and 3B, respectively, the image information passes between the lens 20 and a image pickup device 60, respectively. The rear plate 31 assembled with the front plate 40 covers the optical filter holding section 21 and the optical filter transfer section 28.

The daytime optical filter 30 filters out the light of infrared band from image information input through the lens 50 and transmits the light in the visible band of the image information, whereas the nighttime optical filter 29 transmits the light in the infrared band of the image information.

The optical filter transfer section 28 comprises a stepping motor 35, a gear rod 38, a transfer propelling guide 23, and a guide rod 33. The stepping motor 35 is mounted on an anchoring bracket 36 located at a side of the lower part of the front plate 40. The gear rod 38 is coaxially connected to a shaft of the stepping motor 35. The transfer propelling guide 23 projects from the bottom of the optical filter holding section 21. A downwardly opened internal screw 24 engages the gear rod 38. A guide rod 33, which is inserted into a plurality of alignment grooves 27 formed on a plurality of support projections 26, guides the movement of the support projections 26. The support projections 26 are preferably formed on the top of the optical filter holding section 21 in such a way that the support projections are alternately laterally projected.

The microprocessor 47 generates a control signal for moving the optical filter holding section 21 to the daytime optical filter setting position or the nighttime optical filter setting position in accordance with an externally input mode change signal, or a change in illumination between daytime and nighttime, such as, a power level of a video image signal output from the video image signal processing section 70.

The video image signal processing section 70 converts an electric signal, which is output through the image pickup device 40, into a video image signal and outputs the video image signal to a CCTV or a monitoring system (not shown). The image pickup device 40 converts the image information passing through the daytime optical filter 30 or the nighttime optical filter 29 into an electrical signal.

The drive control section 45 controls driving of the stepping motor 35 of the optical filter switching assembly 20 according to the control signal from the microprocessor 47.

The memory 49 stores position information about a position to which the optical filter holding section 21 is moved by the stepping motor 35, the gear rod 38, and the transfer propelling guide 20, such as, the nighttime optical filter setting position and the daytime optical filter setting position. At the time of manufacturing, the position information for the optical filter holding section 21 being located at the daytime optical filter setting position is recorded into the memory 49.

The surveillance camera 1 constructed as described above operates as follows. Firstly, it is assumed that the surveillance camera 1 is operating in the daytime mode. When a user changes the operation mode from the daytime mode (i.e., color mode) to the nighttime mode (i.e. black and white mode), or when the power level of a video image signal outputted from the video image signal processing section 70 decreases to a predetermined power level of a nighttime video image signal, the microprocessor 47 recognizes the current operation mode as the black and white mode. The microprocessor 47 generates a control signal to move the optical filter holding section 21 from the daytime optical filter setting position to the nighttime optical filter setting position in accordance with the position information of the optical filter holding section 21 recorded in the memory 49.

According to the control signal from the microprocessor 47, the drive control section 43 generates a drive signal so as to rotate the stepping motor 35 of the optical filter switching assembly 30 by a predetermined rotational amount in a direction, for example, clockwise.

As the stepping motor 35 rotates, the gear rod 38 coaxially connected to the shaft of the stepping motor 35 rotates clockwise, so that the transfer driving guide 23 is moved to the right by the downwardly opened internal screw 24, which engages the gear rod 38.

As a result, the optical filter holding section 21 moves to the right from the daytime optical filter setting position shown in FIG. 3A along the guide rod 33 held in the alignment grooves 27 on the support projections to the nighttime optical filter setting position shown in FIG. 3B.

After the optical filter holding section 21 is positioned at the nighttime optical filter setting position, the microprocessor 47 outputs the position information of the optical filter holding section 21 and records it into the memory 49. The video image signal processing section 70 converts an image signal, which is outputted through the image pickup device 60 by way of the lens 50 and the nighttime optical filter 29, into a video image signal and outputs the video image signal to a CCTV or a monitoring system.

Thereafter, when the user changes the operation mode of the camera 10 from the nighttime mode to the daytime mode, or when the power level of the video image signal output from the video image signal processing section 70 increases to the predetermined power level range for the nighttime video image signal, the optical filter holding section 21 is moved to the daytime optical filter setting position. This happens when the microprocessor 47 recognizes the current operation mode as the daytime mode and generates a corresponding control signal. Upon receiving the corresponding control signal, the drive control section 45, stepping motor 35, gear rod 38 and transfer driving guide 23 perform the above-mentioned operations in reverse, thereby moving the optical filter holding section 21 from the nighttime optical filter setting position to the daytime optical filter setting position.

After the optical filter holding section 21 is positioned at the daytime optical setting position, the microprocessor 47 stores the position information of the optical filter holding section 21 in the memory 49. The video image signal processing section 70 converts the image information, which is output through the image pickup device 60 by way of the lens 50 and the daytime optical filter 30, into a video image signal and outputs the video image signal to the CCTV or the monitoring system.

However, in the conventional surveillance camera 1, such a change for a daytime to nighttime position takes a relatively long time, for example, about several seconds. The delay results because the optical filter switching apparatus 10 for use in the conventional surveillance camera 1 operating as described above performs the switching by means of screw connection between the gear rod 38, coaxially connected to the shaft of the stepping motor 35 and the downwardly opened inner screw 24 of the transfer driving guide 23 formed at the bottom of the optical filter holding section 21. Although there may be some difference depending on the combination of the number of revolution of the stepping motor 35 and the gear ratio between the gear rod 38 and the inner screw 24.

If the switching velocity of the optical filter holding section 21 is slow, the surveillance camera not only causes a gap of surveillance when switching the optical filter but also consumes more electric power because the driving time of the stepping motor is increased during the period of the switching operation. Accordingly, if the conventional surveillance camera 1 employs one or more batteries as a power source, the batteries will need to be frequently changed, which is a problem.

In addition, because the optical filter switching apparatus 10 has a screw connection structure, such as the gear rod 38, the downwardly opened internal screw 24, and other complex structures, the conventional camera 1 has problems of severe noise, complicated construction, and inferior endurance.

Furthermore, the optical filter switching apparatus 10 of the conventional surveillance camera 1 is not provided with a separate position sensing section for sensing the position of the optical filter holding section 21. Accordingly, if the power source is turned OFF due to a power failure or the like while the optical filter holding section 21 is being switched, the microprocessor 47 will recognize the optical filter holding section 21 as being located at the completely switched daytime or nighttime optical filter setting position. This results although the optical filter holding section 21 is stopped without having completely switched to the daytime or nighttime optical filter setting position.

In such a case, because the optical filter holding section 21 lies halfway between the daytime and nighttime optical filter setting positions even if the power source is restored, the surveillance camera 1 cannot normally filter light input through the lens 50. In addition, the motor 35 can be overloaded and damaged by the optical filter holding section 21 which displaces by an amount smaller than a preset amount of displacement when the stepping motor 35 is driven to change the modes, whereby the motor may be damaged.

SUMMARY OF THE INVENTION

Accordingly, the present invention has been conceived to solve the above-mentioned problems occurring in the prior art. A principle object of the present invention is to provide an optical filter switching apparatus for switching low pass optical filters for use in an optical instrument, in which an optical filter holding section for holding a daytime optical filter and a nighttime optical filter is preferably directly driven by an actuator provided with a rotary solenoid. When the actuator drives the optical filter holding section, it can be rapidly switched to corresponding one of either a daytime optical filter setting position or a nighttime optical filter setting position. This simplifies the construction and reduces noise, while increasing the reliability of the apparatus.

Another object of the present invention is to provide an optical filter switching apparatus for switching low pass optical filters used in an optical instrument, in which a position sensing section which can sense the position of an optical filter holding section in real time. This capability prevents a malfunction from occurring even if the power source of the apparatus is turned OFF due to power failure or the like while the apparatus is being operated.

In order to achieve the above objects of the present invention, there is provided an optical filter switching apparatus for switching low pass optical filters used in an optical instrument. The optical instrument converts externally input image information into video image information and outputs the video image information. The optical filtering switching apparatus comprises an optical filter holding section for holding a first optical filter for transmitting at least light of first wavelength band in the received image information and a second optical filter for transmitting light of second wavelength band in the received image information. The apparatus further comprises an actuator having a rotary solenoid which is rotated between a first position for retaining the optical filter holding section at a first optical filter setting position and a second position, which retains the optical filter holding section at a second optical filter setting position. Additionally, the apparatus comprises a rotational power transmission section located between the shaft of the rotary solenoid and the optical filter holding section to transmit the rotational force of the rotary solenoid to the optical filter holding section. Furthermore, the apparatus comprises a microprocessor for controlling the rotary solenoid of the actuator in accordance with at least one preferably external input signal and a power level of the video image information, so that the rotary solenoid is rotated to at least one of the first and second positions.

According to a preferred embodiment of the present invention, the rotary solenoid comprises a rotor with a permanent magnet, and a stator positioned to surround the rotor with at least one coil wound around at least one bobbin about an axis which is perpendicular to the shaft of the rotor.

The rotational power transmission section comprises a first rotary lever secured to one end of the shaft of the rotor of the rotary solenoid, and a second rotary lever rotatably secured to a first plate in such a manner that the second rotary lever transmits the rotational force of the first rotary lever to the optical filter holding section. Furthermore, the optical filter holding section may be secured to the first plate.

The first rotary lever preferably comprises a first fixing boss having a bore for fixing one end of the shaft of the rotor so the rotary lever rotates with the shaft of the rotor and a projection formed with a power transmission groove at one end thereof. The second rotary lever comprises a first projection, second projection and a hub. The first projection engages the power transmission groove of the first rotary lever. The second projection engages the power transmission hole formed in the optical filter holding section. The hub is preferably rotatably supported on a second fixing boss formed in the first plate.

The rotational power transmission section may further comprise at least one stopper, which restricts the movement of at least one of the first rotary lever and the optical filter holding section such that the optical filter holding section cannot rotate beyond the first optical filter setting position and the second optical filter setting position. The stopper may comprise a first stopping member having first and second rotary lever stopping projections provided on a second plate secured to the first plate so as to restrict the movement of the first rotary lever. The stopper may also comprise a second stopping member having a rotation restriction projection formed on the optical filter holding section with first and second stopping projections provided on the first plate so as to restrict the movement of the rotation restriction projection of the optical filter holding section.

Embodiments of the inventive optical filter switching apparatus may further comprise an elastic retainer for securely retaining the rotary solenoid at one of the first and second positions, thereby preventing the optical filter holding section from moving, if the rotary solenoid rotates, even if the power source is turned OFF.

The elastic retainer preferably comprises a return spring, one end of the return spring being supported at a first support projection provided in the second plate, to which the rotary solenoid is secured, and the other end being supported at a second support projection formed on the first rotary lever.

If one of forward current and reverse current is applied, the rotary solenoid is rotated to the first position, and if the other is applied, the rotary solenoid is rotated to the second position.

Alternatively, it is possible to arrange the rotary solenoid in such a way that if either forward current or reverse current is applied, the rotary solenoid is rotated to the second position and if no current is applied, the rotary solenoid is returned to the first position.

In addition, the inventive optical filter switching apparatus may further comprise a position sensing section capable of sensing the position of the optical filter holding section in real time.

The position sensing section preferably comprises a hall switch provided on the bobbin of the rotary solenoid.

The hall switch preferably comprises a hall sensor, an amplifier, a reference voltage generation section and a comparator. The hall sensor generates voltage in accordance with the intensity of the magnetic field generated from the rotary solenoid. The amplifier amplifies the voltage generated from the hall sensor. The reference voltage generation section outputs a reference voltage in accordance with a control signal from the microprocessor. The comparator generates a signal announcing the position of the optical filter holding section based on the comparison between the voltage amplified by the amplifier and the reference voltage output from the reference voltage generation section.

BRIEF DESCRIPTION OF THE DRAWINGS

The above and other objects, features and advantages of the present invention will be more apparent from the following detailed description taken with reference to the accompanying drawings, in which.

DETAILED DESCRIPTION OF THE PREFERRED EMBODMIMENTS

Hereinbelow, embodiments of the inventive optical filter switching apparatus for use in an optical instrument will now be described in detail with reference to the accompanying drawings.

Figure 4:
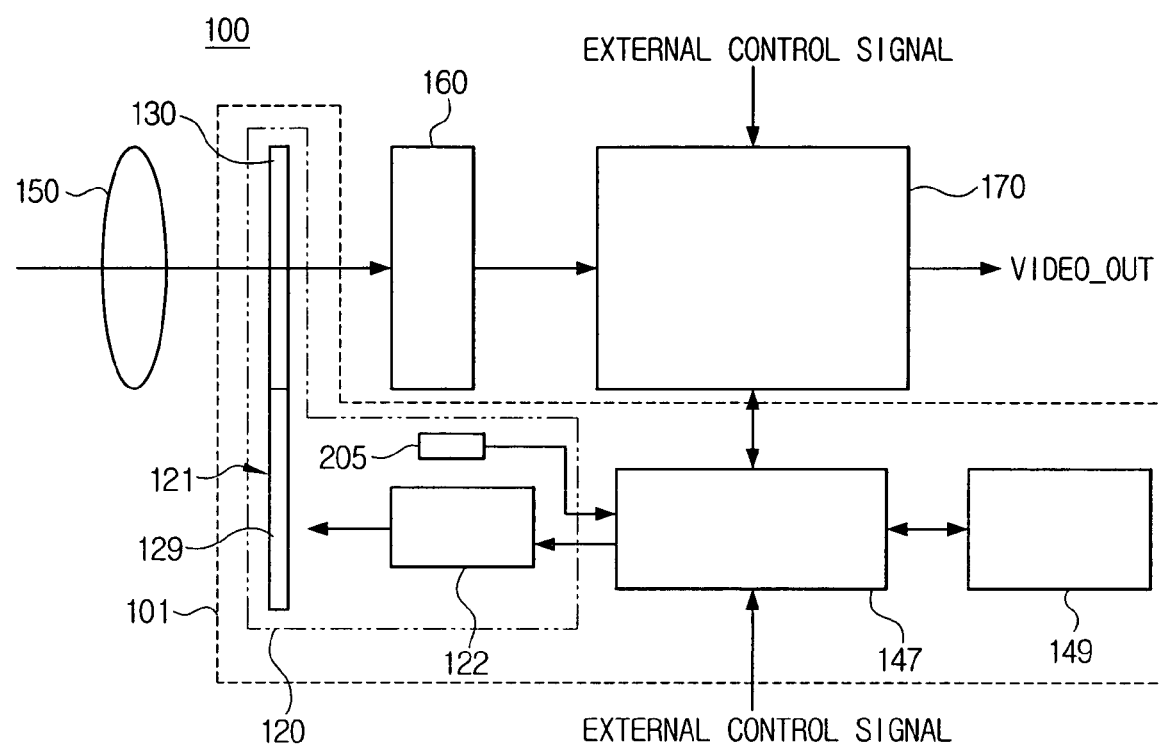
FIG. 4 is block diagram of a conventional surveillance camera, to which an embodiment of the inventive optical filter switching apparatus is applied.

Referring to FIG. 4, a surveillance camera 100 such as a CCTV camera is illustrated as an instrument, to which an embodiment of the inventive optical filter switching apparatus 120 is applied, in a block diagram.

The surveillance camera 100 comprises a lens 150, an embodiment of the optical filter switching apparatus 101, an image pickup device 160, and a video image signal processing section 170.1 The lens 150 receives image information in the form of light. An embodiment of the inventive optical filter switching apparatus 101 switches a daytime optical filter 130 and a nighttime optical filter 129 in such a manner that the daytime optical filter 130 or the nighttime optical filter 129 is selectively positioned in the path of the image information in accordance with light intensity of the image information and a mode change signal from the user. The image pickup device 160 converts the image information passing the daytime optical filter 130 or the nighttime optical filter 129 into an electric signal. The video image signal processing section 170 converts the image information, which is output through the image pickup device 160, into a video image signal and then outputs the video image signal to a CCTV or a monitoring system (not shown).

The daytime optical filter 130 comprises an infrared light ray cut filter, which removes infrared rays and transmits visible rays in the image information. The nighttime optical filter 129 comprises a dummy filter, which transmits both visible light rays and infrared light rays.

Figure 1:
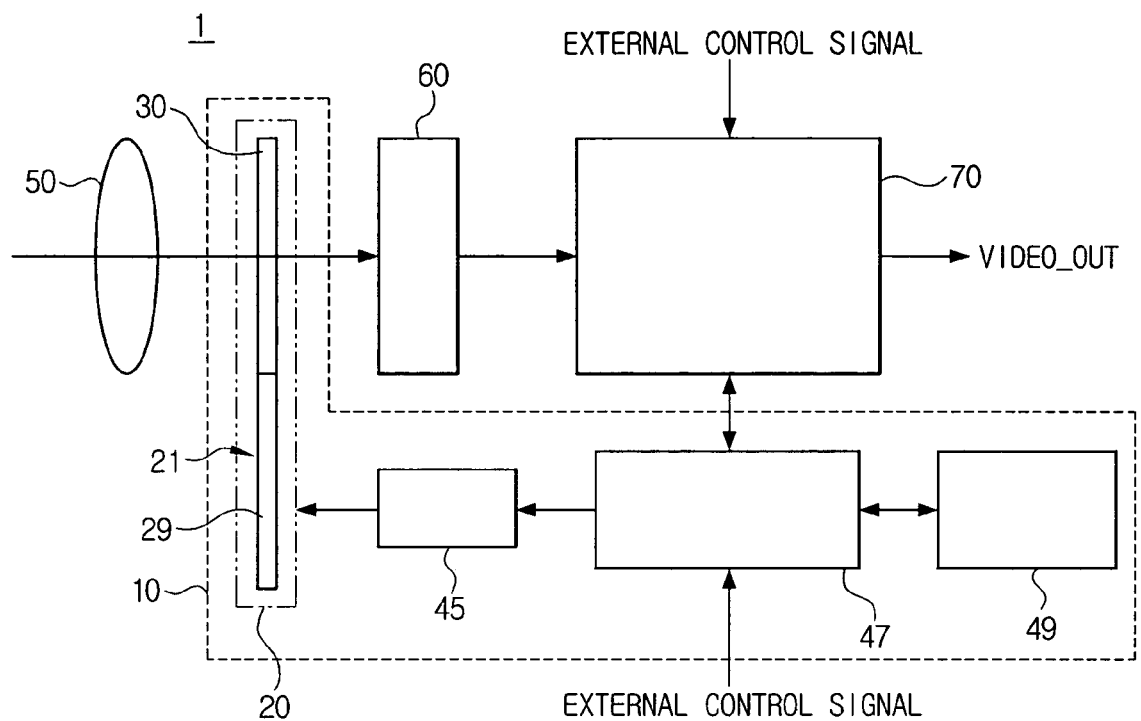
FIG. 1 is a block diagram of a conventional surveillance camera.
Figure 2:
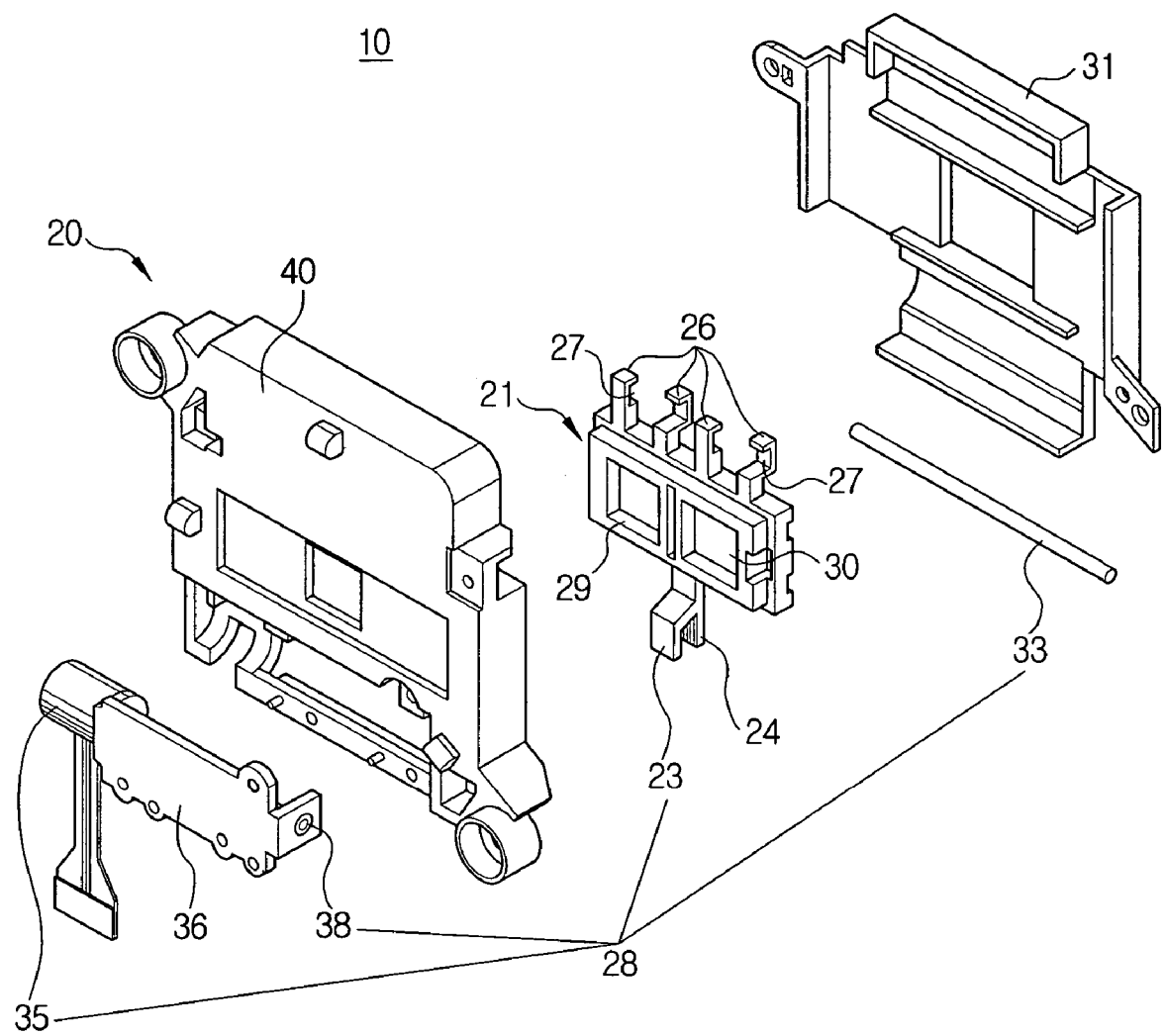
FIG. 2 is an exploded perspective view of an optical filter switching apparatus applied to the surveillance camera shown in FIG. 1.
Figure 3A:
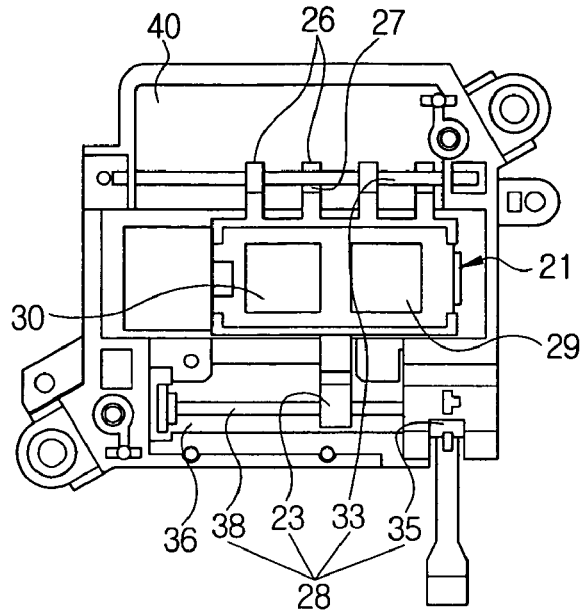
FIGS. 3A and 3B are rear views for illustrating the operation of the optical filter switching apparatus shown in FIG. 2.
Figure 3B:
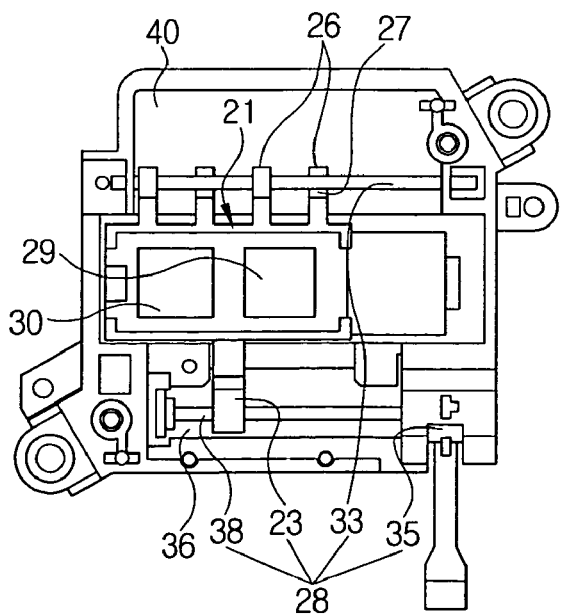

Because the lens 150, the image pickup device 160 and the video image signal processing section 170 are identical to those of the conventional surveillance camera 1 described with reference to FIGS. 1 to 3 in construction and functional action, a detailed description thereof is omitted.

An embodiment of the inventive optical filter switching apparatus 101 comprises an optical filter switching assembly 120, a microprocessor 147, and a memory 149.

As shown in FIGS. 5, 6A, 6B and 6C, the optical filter switching assembly 120 comprises an optical filter holding section 121, an actuator 122, and an assembly plate 140. The optical filter holding section 121 has a daytime optical filter 130 and a nighttime optical filter 129 secured to a daytime optical filter opening 130a and a nighttime optical filter opening 129a through first and second fused fixing parts 130b, 129b, respectively with openings being formed to be spaced from each other in the circumferential direction. The actuator 122 comprises a rotary solenoid 180, which rotates the optical filter holding section 121 clockwise or counterclockwise within a predetermined range of angle, such as, within 60°, based on either forward or reverse currents. Additionally, a rotational power transmission section 148 located between a shaft of the rotary solenoid 180 and the optical filter holding section 121 transfers the rotational force of the solenoid 180 to the optical filter holding section 121. An assembly plate 140 has a front side with a lens 150 and a rear side with an image pickup device 160. The rotary solenoid 180 is secured to the front side and the optical filter holding section 121 being rotatably secured to the rear side of the assembly plate 140, respectively.

The optical filter holding section 121 is provided with a pivot boss 123 on the upper part thereof, which receives a pivot axle 141 formed on the rear side of the assembly plate 140, so the optical filter holding section 121 is supported to be cable of pivoting about the pivot axle 141.

The optical filter holding section 121 is provided with a rotation restriction projection 126 on the bottom part thereof, which is engaged with first and second stopping projections 145, 146, respectively, formed on the rear side of the assembly plate 140. This arrangement restricts the rotational movement of the optical filter holding section 121 when the optical filter holding section 121 is rotated over 60° either clockwise or counterclockwise by the second rotary lever 147 of the rotational power transmission section 148, which will be described later in more detail. The first and second stopping projections 145, 146, respectively, and the rotation restriction projection 126 form a second stopping member 125 of a stopper 192. The second stopping member 125 to be described later in more detail.

A power transmission hole 124 is formed at the left side of the pivot boss 123 in the optical filter holding section 121, which receives a second link projection 147b of the second rotary lever 147 in the rotation transmission section 148. The power transmission hole 124 extends a predetermined length toward the pivot axle 141, so that when the second rotary lever 147 rotates about 60° to rotate the optical filter holding section 121. The second link projection 147b can preferably freely rock in the rotating trace within the power transmission hole 124.

Figure 7A:
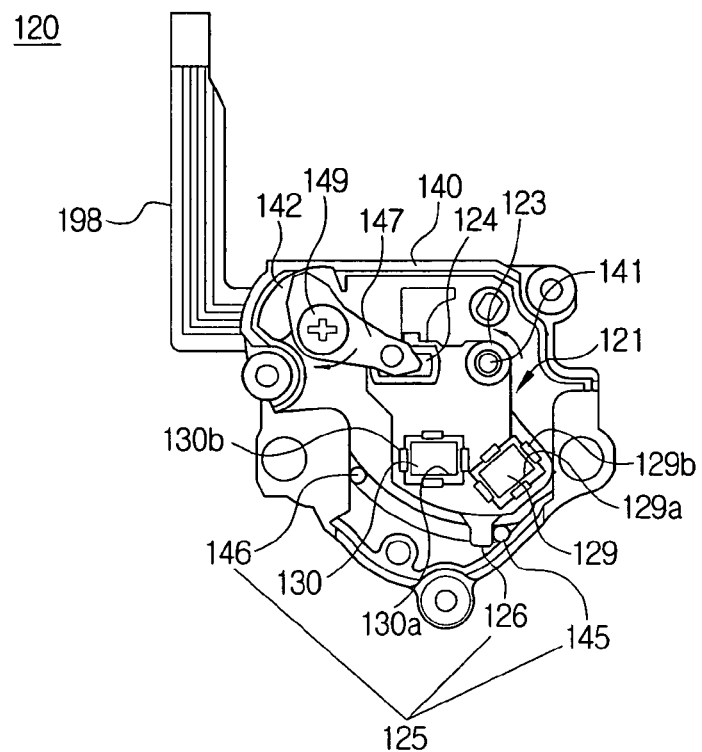
FIGS. 7A and 7B are rear views for illustrating the operation of the optical filter switching assembly of the optical filter switching apparatus shown in FIG. 4 according to an embodiment of the present invention.
Figure 7B:
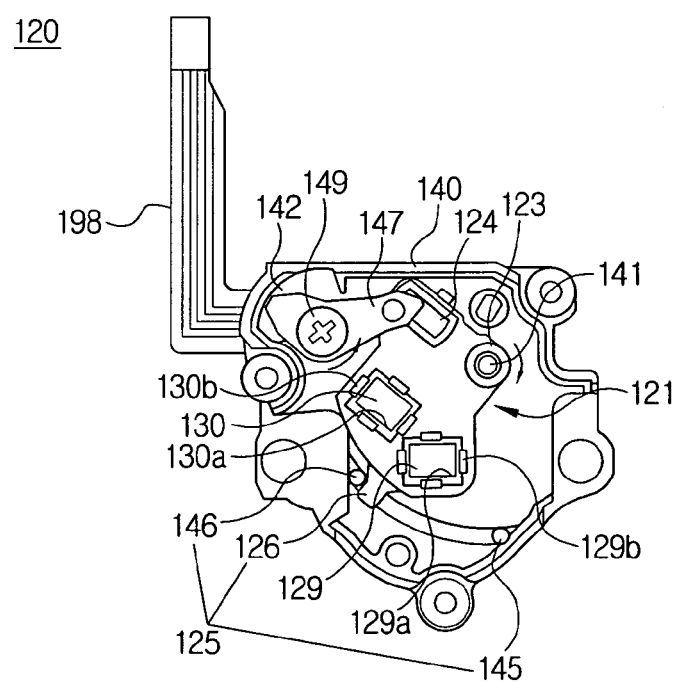

Therefore, as shown in FIG. 7A, when the optical filter holding section 121 is rotated counterclockwise about 60° about the pivot axle 141 by the second link projection 147b of the second rotary lever 147 received in the power transmission hole 124, it is stopped by the rotation restriction projection 126 engaged with the first stopping projection 145. Upon being stopped by the first stopping projection 145, the optical filter holding section 121 is arranged at the daytime optical filter setting position. In this position, the daytime optical filter 130 is positioned on the path of image information, i.e., in alignment with an image information passage window 144 formed in the assembly plate 140. Meanwhile, as shown in FIG. 7B, when the optical filter holding section 121 is rotated clockwise about 60° about the pivot axle 141 by the second link projection 147b of the second rotary lever 147, it is stopped by the rotation restriction projection 126 engaged with the second stopping projection 146. Upon being stopped by the second stopping projection 146, the optical filter holding section 121 is arranged at the nighttime optical filter setting position. In this position, the nighttime optical 129 is positioned in alignment with the image information passage window 144.

Here, although it is described that the rotation angle of about 60° for the optical filter holding section 121, 60° is represented merely as an example for an angle, over which the optical filter holding section 121 rotates between the daytime optical filter setting position and the nighttime optical filter setting position. Of course, the angle may be set to a different value.

Figure 8:
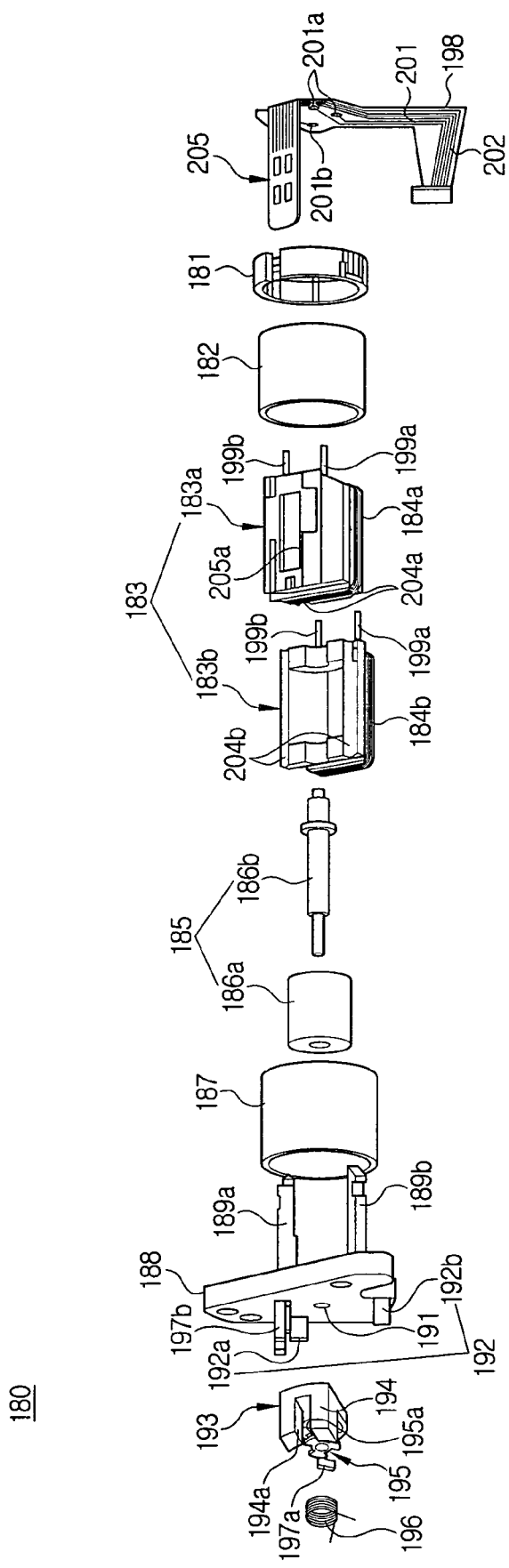
FIG. 8 is an exploded perspective view of a rotary solenoid of an actuator of the optical filter switching assembly shown in FIG. 5 according to an embodiment of the present invention.
Figure 9A:
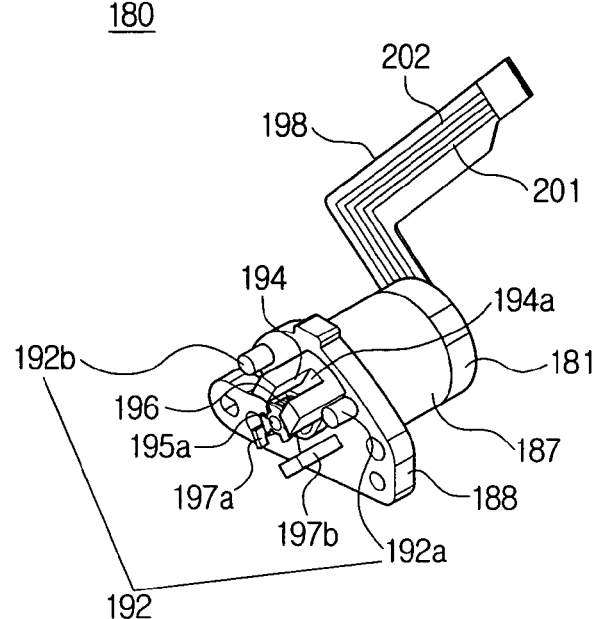
FIGS. 9A and 9B are rear side perspective view and a front view of the rotary solenoid of the actuator of the optical filter switching assembly shown in FIG. 8, respectively, according to an embodiment of the present invention.
Figure 9B:
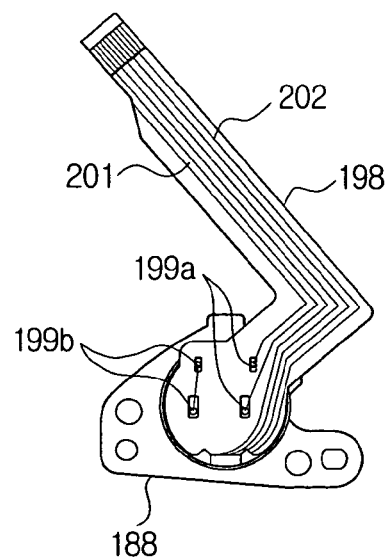

As shown in FIGS. 8, 9A and 9B, the rotary solenoid 180 of the actuator 122 comprises a rotor 185, a stator 183, a first elongate bobbin support 189a, a second elongate bobbin support 189b, a tape, and a flexible printed circuit board 198. The rotor 185 having a cylindrical permanent magnet 186a and a shaft 186b for fixing a permanent magnet 186a. The stator 183 having first and second bobbins 183a, 183b positioned around the rotor 185 and first and second coils 184a, 184b wound around the first and second bobbins 183a, 183b, respectively. The first and second elongate bobbin supports 189a, 189b are formed on a base plate 188 and inserted into longitudinal slots 204a, 204b to support the first and second bobbins 183a, 183b. The longitudinal slots 204a, 204b are longitudinally formed at the opposite edges of the surfaces of the first and second bobbins 183a, 183b, which confront with each other when the first and second bobbins 184a, 184b are engaged with each other. The tape wraps the first and second bobbins 184a, 184b supported by the first and second bobbin supports 189a, 189b. The flexible printed circuit board (FPCB) 198 has input and output terminals 201a, 201b connected to the input and output terminals 199a, 199b of the first and second coils 184a, 184b, which are wound around the first and second bobbins 184a, 184b, and a wiring 201.

The first and second coils 184a, 184b are wound around the first and second bobbins 183a, 183b about an axis perpendicular to the shaft 186b of the rotor 185, respectively.

Figure 10A:
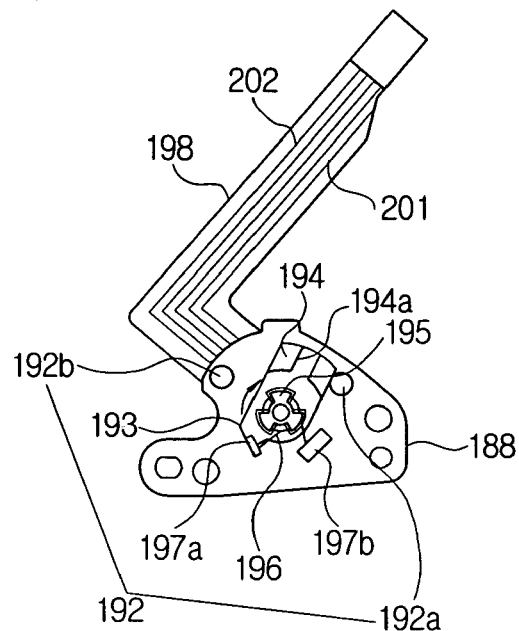
FIGS. 10A and 10B are rear views for illustrating the operation of the rotary solenoid of the optical filter switching assembly shown in FIG. 8 according to an embodiment of the present invention.

Therefore, if, for example, forward current is applied to the first and second coils 184a, 184b through the wiring 201, the input terminal 201a of the flexible printed circuit board 198, and the input terminal 199a of the first and second coils 184a, 184b, the first and second coils 184a, 184b will generate a magnetic field. The direction of the magnetic field will be perpendicular to the direction of the current flowing through the coils 184a, 184b, which corresponds to the upward and downward directions along the axis perpendicular to the shaft 186b of the rotor. For example, in the upward direction, the magnetic field will rotate the rotor 185 of the rotary solenoid 180 will be rotated in one direction, for instance, clockwise, to a predetermined range of angle, such as, about 60°, and positioned at a first position (FIGS. 10A and 7A). There, the optical filter holding section 121 will be retained at the daytime optical filter setting position through the rotational power transmission section 148, which will be described in more detail later.

Figure 10B:
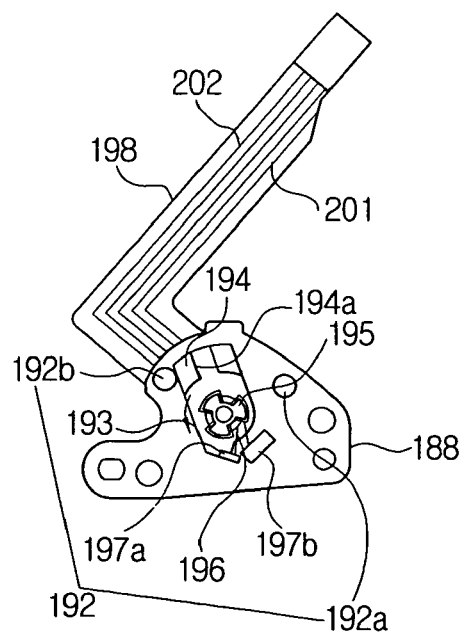

Whereas, if reverse current is applied to the first and second coils 184a, 184b of the rotary solenoid 180, the first and second coils 184a, 184b will generate a magnetic field in the downward direction of the axis perpendicular to the shaft 186b of the rotor 185, causing the rotor to rotate counterclockwise about 60° and stop at a second position (FIGS. 10B and 7B). In this second position, the optical filter holding section 121 will be retained at the nighttime optical filter setting position through the rotational power transmission section 148.

Figure 5:
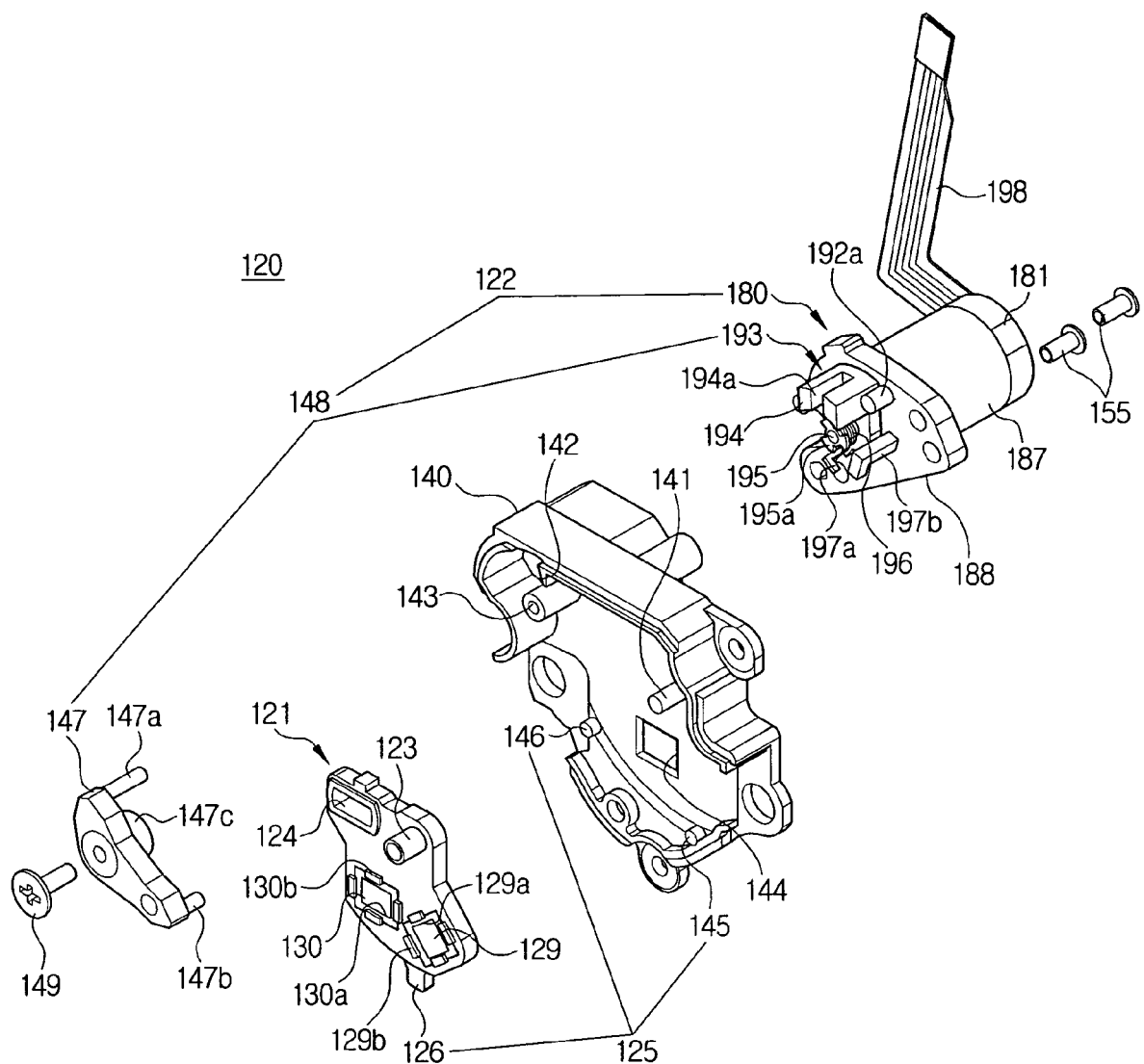
FIG. 5 is an exploded perspective view of an optical filter switching assembly of an embodiment of the optical filter switching apparatus shown in FIG. 4 according to an embodiment of the present invention.

Turning to FIG. 5, the rotational power transmission section 148 of the actuator 122 comprises a first rotary lever 193 and a second rotary lever 147. The first rotary lever 193 is secured to one end of the shaft 186b of the rotor 185 of the rotary solenoid 180. The one end protrudes through the fixing hole 191 (FIG. 8) formed in the base plate 188. The second rotary lever 147 is rotatably secured to the assembly plate 140 to which the optical filter holding section 121 is fixed. The second rotary lever 147 transmits the rotational force of the first rotary lever 193 to the optical filter holding section 121. The base plate 188 is fixed to the base plate 188 by screws 155.

As shown in FIGS. 8, 9A and 9B, the first rotary lever 193 has a first fixing boss 195 provided with a fixing hole for fixing one end of the shaft 186b of the rotor 185 of the rotary solenoid 180 so that the first rotary lever 193 rotates along with the shaft 186b and a pair of projections 194. A power transmission groove 194a is formed between the pair of projections 194.

Figure 6A:
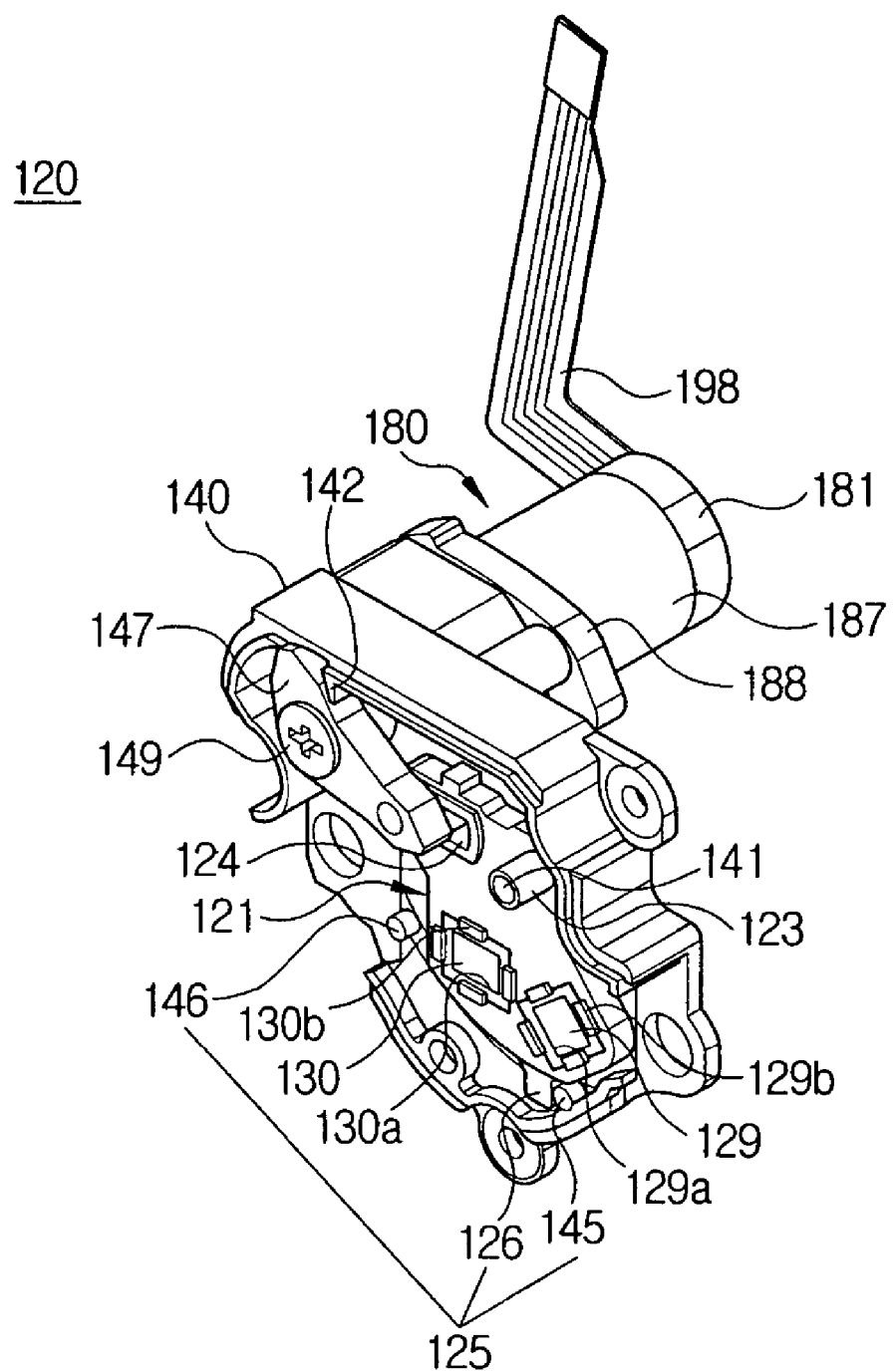
FIGS. 6A, 6B and 6C are rear side perspective view, front side perspective view and front view partial in section of the optical filter switching assembly of the optical filter switching apparatus shown in FIG. 4, respectively, according to an embodiment of the present invention.
Figure 6B:
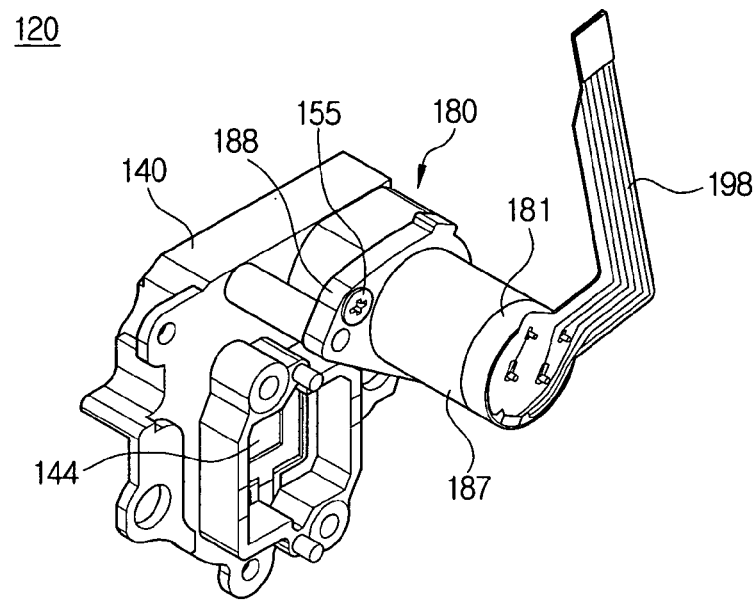
Figure 6C:
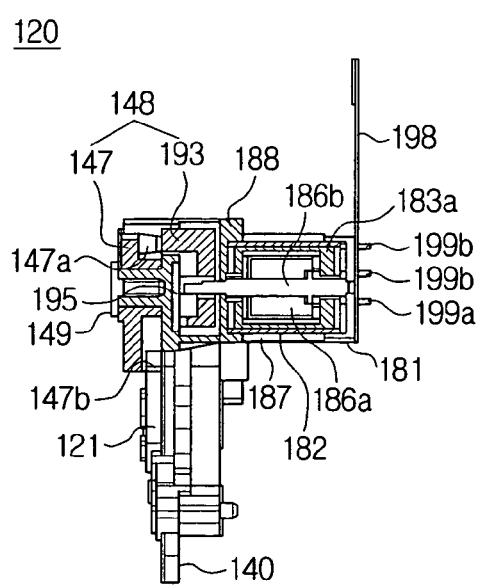

As shown in FIGS. 5, 6A and 6C, the second rotary lever 147 comprises a first link projection 147a to be engaged with the power transmission groove 194a of the first rotary lever 193 through the opening 142 formed in the assembly plate 140. A second link projection 147b engages the power transmission hole 124 formed in the optical filter holding section 121, and a hub 147c is rotatably supported on the second fixing boss 143 formed on the assembly plate 140.

The second rotary lever 147 is supported on the second fixing boss 143 by a breakaway prevention screw or pin 149 secured to the second fixing boss 143 through the hub 147c in such a manner that the second rotary lever 147 cannot break away from the second fixing boss 143.

The rotational power transmission section 148 may further comprise stoppers 192, 125 for restricting the movement of the first rotary lever 193 and the optical filter holding section 121. The stoppers 192 and 125 prevent the optical filter holding section 121 from rotating beyond the range between the daytime optical filter setting position and the nighttime optical filter setting position, for example, over about 60° of rotation.

The stopper 192 comprises a first rotation member stopping projection 192a and second rotation member stopping projections 192b provided on the base plate 188 so as to restrict the pivot of the first rotational lever 193. The second stopping member 125 comprises a rotation restriction projection 126 projectedly formed on the bottom of the optical filter holding section 121, and first and second stopping projections 145, 146 formed on the assembly plate 140 to restrict the movement of the rotation restriction projection 126.

Therefore, even if the rotor 185 of the rotary solenoid 180 is rotated over 60° by a magnetic field, the first rotary lever 193 and the optical filter holding section 121 will be stopped at the daytime optical filter setting position or the nighttime optical filter setting position by the first and second stopping members 192 and 125, respectively.

Turning to FIG. 8, the optical filter switching assembly 120 of an embodiment of the inventive optical filter switching apparatus 101 further comprises an elastic retainer 196 for retaining the first rotary lever 193 of the rotational power transmission section 148 of the actuator 122 at the first position, so that the optical filter holding section 121 cannot rock even if the power source is turned OFF.

The elastic retainer 196, preferably comprises a return spring fitted on the first fixing boss 195 of the first rotary lever 193 with one end of the return spring being supported by a first support projection 197 provided on the base plate 188 of the rotary solenoid 180 and the other end of the return spring being supported by a second support projection 197a formed on the first rotary lever 193.

In order to prevent the return spring 196 from breaking away, the first fixing boss 195 is provided with a breakaway prevention cap 195a on the top portion thereof.

As shown in FIG. 4, the microprocessor 147 generates a control signal for controlling the rotary solenoid 180 to rotate to one of the first and second positions if an operation mode changing signal is input by a user or if the power level of video image information output from the video image signal processing section 170 increases or decreases to a predetermined power level for the daytime video image signal or a predetermined power level for the nighttime video image signal.

In addition, the optical filter switching assembly 120 of an embodiment of the inventive optical filter switching apparatus 101 further comprises a position sensing section 205 which is capable of sensing the position of the optical filter holding section 121 in real time.

As shown in FIG. 8, the position sensing section 205 comprises a hall switch formed as a chip to be connected to the wiring 202 in the flexible print circuit board 198. The hall switch extends between an external surface 205a of the second bobbin 183a of the rotary solenoid 180 and the tape 182, so that it can sense the magnetic field generated from the first and second coils 184a, 184b, respectively.

Figure 11:
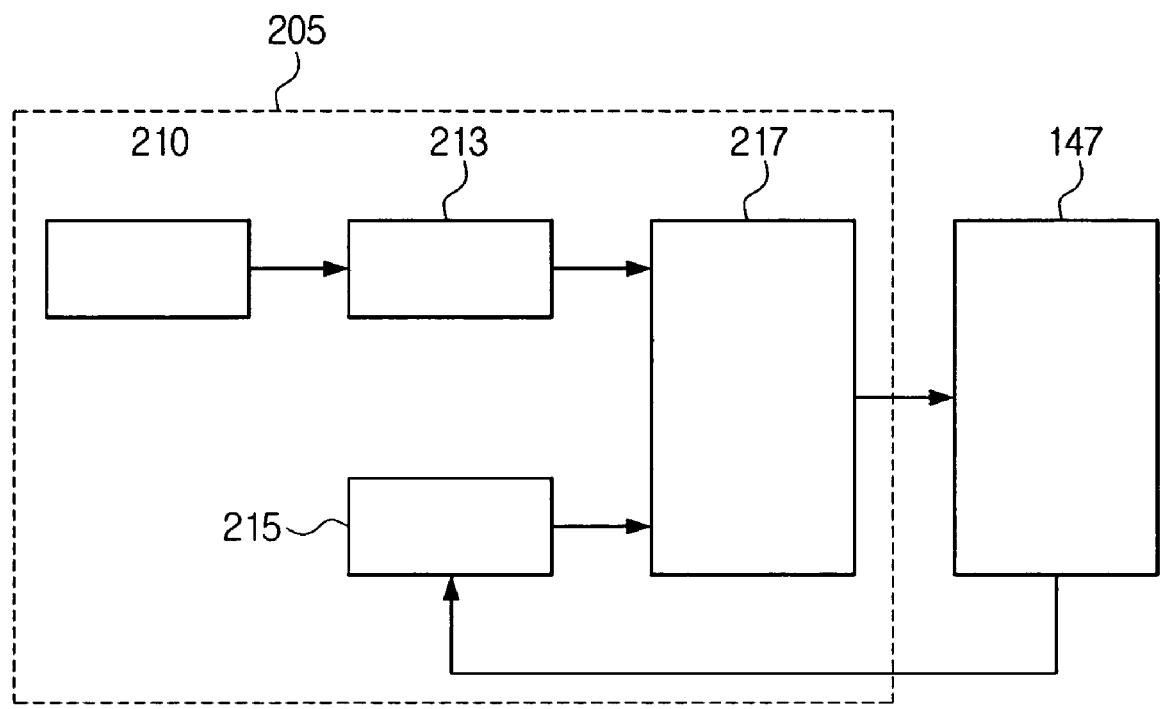
FIG. 11 is a block diagram for illustrating a hall switch of the optical filter switching assembly shown in FIG. 5 according to an embodiment of the present invention.

As shown in FIG. 11, the hall switch has a hall sensor generating voltage depending on the direction and intensity of magnetic field generated from the first and second coils 184a, 184b, respectively. An amplifier 213 amplifies the voltage generated from the hall sensor, while a reference voltage generation section 215 outputs a reference voltage on the basis of a control signal from the microprocessor 147. A comparator 217 compares the amplified voltage output from the amplifier 213 and the reference voltage output from the reference voltage generation section 215. The reference voltage generation section 205 outputs a high signal for indicating the first position of the rotary solenoid 180 or low signal for indicating the second position of the rotary solenoid 180 to the microprocessor 147.

The comparator 217 generates a high signal if the voltage amplified by the amplifier 213 is higher than the reference voltage output from the reference voltage generation section 215. While the comparator 217 generates a low signal if the voltage amplified by the amplifier 213 is lower than the reference voltage output from the reference voltage generation section 215.

The memory 149 stores, under the control of the microprocessor 147, the position information of the rotary solenoid 180 sensed by the hall switch, that is, the daytime optical filter setting position and nighttime optical filter setting position, and outputs the stored information to the microprocessor 147 when there is a demand from the microprocessor 147.

In the above, although the embodiments of the inventive optical filter switching apparatus 101 has been described and exemplified with respect to the case in which the rotary solenoid 180 is operated using both the forward current and reverse current, the rotary solenoid 180 may be operated using only one of either the forward or reverse currents. That is, it is possible to construct the rotary solenoid 180 in such a manner that if one of the forward and reverse currents is applied to the rotary solenoid 180, the rotary solenoid 180 is rotated to the second position and if no current is applied to the rotary solenoid 180, the rotary solenoid is returned to the first position by the elastic retainer 196. In such a case, the elastic retainer serves as elastic returning and retaining means for automatically returning the rotary solenoid 180 to the first position when no current is applied, and preventing the rotary solenoid 180 from rocking when the power source is turned OFF.

Furthermore, although the inventive optical filter switching apparatus 101 has been described and exemplified with respect to the case in which the apparatus is applied to a surveillance camera such as a CCTV camera, the present invention is not limited thereto and can be employed as an optical filter switching apparatus for a different iris system.

Now, the operation of a surveillance camera 100 provided with an embodiment of the inventive optical filter switching system 101 constructed as described above is described in more detail with reference to FIGS. 4 to 11.

At first, assuming that the current operation mode of the surveillance camera 100 is the daytime mode (that is, color mode), if the user changes the operation mode of the camera 100 from the daytime mode to the nighttime mode (that is, black/white mode) or if the power level of the video image signal output from the video image signal processing section 170 decreases to the predetermined power level of the nighttime video image signal, the microprocessor 147 recognizes the current operation mode as the black/white mode and generates a control signal to move the optical filter holding section 121 from the daytime optical filter setting position to the nighttime optical filter setting position in accordance with the position information of the optical filter holding section 121 stored in the memory 149.

According to the signal of the microprocessor 147, if reverse current is applied to the first and second coils 184a, 184b, respectively, of the rotary solenoid 180 of the actuator 122 through the input terminal 201 a of the flexible print circuit board 198, and the input terminal 199a of the first and second coils 184a and 184b, which generate a downward magnetic field along the axis perpendicular to the shaft 186b of the rotor 185. As a result, due to the downward magnetic field, the rotor 185 having the permanent magnet 186a is rotated counterclockwise from the first position shown in FIG. 10A to the second position shown in FIG. 10B.

As the rotor 185 rotates counterclockwise, the first rotary lever 193 secured to one end of the shaft 186b of the rotor 185 through the first fixing boss 195 also rotates counterclockwise against the force exerted by the return spring of the elastic retainer 196. The second rotary lever 147 having the first link projection 147a engaged with the power transmission groove 194a of the first rotary lever 193 also rotates counterclockwise about the second fixing boss 143.

Therefore, the optical filter holding section 121 with the power transmission hole 124, which engages the second link projection 147b of the second rotary lever 147, rotates clockwise about the pivot shaft due to the counterclockwise rotation of the second rotary lever 147, thereby moving from the daytime optical filter setting position shown in FIG. 7A to the nighttime optical filter setting position shown in FIG. 7B.

Meanwhile, if reverse current is applied to the first and second coils 184a, 184b, the first and second coils 184a, 184b generate a downward magnetic field along the axis perpendicular to the shaft 186b of the rotor 185. The hall sensor 210 of the position sensing section 205 extending between the external surface 205a of the second bobbin 183a of the rotary solenoid 180 and the tape 182 generates a voltage corresponding to the intensity and direction of the generated downward magnetic field.

The voltage generated from the hall sensor 120 is amplified by the amplifier 213 and output to the comparator 217. The comparator 217 compares the voltage amplified by the amplifier 213 and a reference voltage. The reference voltage is output by the reference voltage generation section 215 in response to a control signal from the microprocessor 147. The comparator 217 generates a high signal if the amplified voltage is higher than the reference voltage and low signal if the amplified voltage is lower than the reference voltage.

Here, assuming that the voltage amplified by the amplifier 213 is lower than the reference voltage, the comparator 217 generates a low signal, which preferably is the signal for indicating that the rotor 186 of the rotary solenoid 180 is positioned at the second position. In other words, the low signal is prefereably the signal for indicating that the optical filter holding section 121 is positioned at the nighttime optical filter setting position.

Therefore, the microprocessor 147 records the position information of the optical filter holding section 121 corresponding to the low signal into the memory 149 and the video image signal processing section 170 converts the image information, which is outputted through the image pickup device 160 by way of the lens 150 and the nighttime optical filter 129, into a video image signal and outputs the video image signal to a CCTV or a monitoring system.

Thereafter, if the user changes the current operation mode of the surveillance camera 100 from the nighttime mode to the daytime mode, or if the power level of the video image signals outputted from the video image signal processing section 170 increases to the predetermined power level of the daytime video image signals, the microprocessor 147 generates a control signal for controlling the rotary solenoid 180 to move from the second position to the first position.

As a result, forward current is preferably applied to the first and second coils 184a, 184b of the rotary solenoid 180. The rotary solenoid 180 and the rotational power transmission section 148 perform an operation opposite to that described above, thereby rotating clockwise from the second position shown in FIG. 10B to the first position shown in FIG. 10A. The optical filter holding section 121 rotates counterclockwise from the nighttime optical filter setting position shown in FIG. 7B to the daytime optical filter setting position shown in FIG. 7A.

Meanwhile, when the first and second coils 184a, 184b generate an upward magnetic field along the axis perpendicular to the shaft 186b of the rotor 185 as forward current is applied to the first and second coils 184a, 184b, the hall sensor 210 of the position sensing section 205 generates a voltage corresponding to the intensity and direction of the generated upward magnetic field.

The voltage generated from the hall sensor 210 is amplified by the amplifier 213 and output to the comparator 217. The comparator 217 compares the voltage amplified by the amplifier 213 and a reference voltage. The reference voltage is output by the reference voltage generation section 215 in response to a control signal from the microprocessor 147. The comparator 217 generates a high signal indicating that the rotor 186 of the rotary solenoid 180 is positioned at the first position. In other words, the high signal indicates that the optical filter holding section 121 is positioned at the daytime optical filter setting position.

The microprocessor 147 records the position information of the optical filter holding section 121 corresponding to the high signal into the memory 149. The video image signal processing section 170 converts the image information, which is outputted through the image pickup device 160 by way of the lens 150 and the nighttime optical filter 129, into a video image signal and outputs the video image signal to the CCTV or the monitoring system.

In addition, if the power source of the surveillance camera 100 is turned OFF for the purpose of maintenance and repair, the optical filter holding section 120 does not rock because the elastic retainer 196 retains the first rotary lever 193 of the rotational power transmission section 148 of the actuator 122, and hence the rotary solenoid 180 remains at the first position, which means the rotary solenoid 180 does not rotate.

As described above, because embodiments of the inventive optical filter switching apparatus used in an optical instrument directly drives an optical filter holding section holding daytime and nighttime optical filters using an actuator provided with a rotary solenoid, it is possible to rapidly switch the optical filter holding section to a daytime or nighttime optical filter setting position, while simplifying the construction and enhancing anti-noise and endurance characteristics.

In addition, because embodiments of the inventive optical filter switching apparatus used in an optical instrument is provided with a position sensing section which is capable of sensing the position of the optical filter holding section in real time, it is possible to prevent a malfunction from occurring even if the power source is turned OFF due to power failure or the like while the apparatus is operating.

While the preferred embodiments of the present invention have been shown and described with reference to the representative embodiments thereof in order to exemplify the principle of the present invention, the present invention is not limited to the embodiments. It will be understood that various modifications and changes can be made by those skilled in the art without departing from the spirit and scope of the invention as defined by the appended claims. Therefore, it shall be considered that such modifications, changes and equivalents thereof are all included within the scope of the present invention.

What is claimed is:

1. An optical filter switching apparatus for switching low pass optical filters for use in an optical instrument for converting externally input image information into video image information and outputting the video image information, wherein the apparatus comprises:

an optical filter holding section for holding a first optical filter for transmitting at least light of a first wavelength band in the image information and a second optical filter for transmitting light of a second wavelength band in the image information;

an actuator having a rotary solenoid which rotates between a first position for retaining the optical filter holding section at a first optical filter setting position so that the first filter is positioned in the path of the image information and a second position for retaining the optical filter holding section at a second optical filter setting position so that the second filter is positioned in the path of the image information, and a rotational power transmission section located between a shaft of the rotary solenoid and the optical filter holding section to transmit the rotational force of the rotary solenoid to the optical filter holding section, wherein the rotational power transmission section comprises a first rotary lever secured to one end of the shaft of the rotary solenoid, and a second rotary lever rotatably secured to a first plate in such a manner that the second rotary lever transmits the rotational force of the first rotary lever to the optical filter holding section, the optical filter holding section being fixed to the first plate; and a microprocessor for controlling the rotary solenoid of the actuator in accordance with at least one of an input signal which is externally input and a power level of the video image information, so that the rotary solenoid is rotated to at least one of the first and second positions.

2. An optical filter switching apparatus as claimed in claim 1, wherein the rotary solenoid comprises:
 a rotor provided with a permanent magnet, and
 a stator positioned to surround the rotor and provided with at least one coil wounded around at least one bobbin about an axis which is perpendicular to the shaft of the rotor.

3. An optical filter switching apparatus for switching low pass optical filters for use in an optical instrument for converting externally input image information into video image information and outputting the video image information, wherein the apparatus comprises:
 an optical filter holding section for holding a first optical filter for transmitting at least light of a first wavelength band in the image information and a second optical filter for transmitting light of a second wavelength band in the image information;
 an actuator having a rotary solenoid which rotates between a first position for retaining the optical filter holding section at a first optical filter setting position and a second position for retaining the optical filter holding section at a second optical filter setting position, wherein the rotary solenoid comprises a rotor provided with a permanent magnet, and a stator positioned to surround the rotor and provided with at least one coil wounded around at least one bobbin about an axis which is perpendicular to the shaft of the rotor;
 and a rotational power transmission section located between a shaft of the rotary solenoid and the optical filter holding section to transmit the rotational force of the rotary solenoid to the optical filter holding section, wherein the rotational power transmission section comprises a first rotary lever secured to one end of the shaft of the rotor of the rotary solenoid, and a second rotary lever rotatably secured to a first plate in such a manner that the second rotary lever transmits the rotational force of the first rotary lever to the optical filter holding section, the optical filter holding section being fixed to the first plate, wherein the first rotary lever comprises a first fixing boss having a bore for fixing one end of the shaft of the rotor so that the first rotary lever rotates along with the shaft of the rotor, and a projection formed with a power transmission groove at one end thereof, and wherein the second rotary lever comprises a first projection engaged with the power transmission groove of the first rotary lever, a second projection engaged with a power transmission hole formed in the optical filter holding section, and a hub rotatably supported on a second fixing boss formed in the first plate; and a microprocessor for controlling the rotary solenoid of the actuator in accordance with at least one of an input signal which is externally input and a power level of the video image information, so that the rotary solenoid is rotated to at least one of the first and second positions.

4. An optical filter switching apparatus as claimed in claim 3, further comprising at least one stopper for restricting the movement of at least one of the first rotary lever and the optical filter holding section in such a way that the optical filter holding section cannot rotate beyond the first optical filter setting position and the second optical filter setting position.

5. An optical filter switching apparatus as claimed in claim 4, wherein the stopper comprises:
 a first stopping member having first and second rotary lever stopping projections provided on a second plate secured to the first plate to restrict the movement of the first rotary lever; and
 a second stopping member having a rotation restriction projection formed on the optical filter holding section, and first and second stopping projections provided on the first plate to restrict the movement of the rotation restriction projection of the optical filter holding section.

6. An optical filter switching apparatus as claimed in claim 3, further comprising an elastic retainer for securely retaining the rotary solenoid at one of the first and second positions, thereby preventing the optical filter holding section from moving due to the rotating of the rotary solenoid even if the power source is turned OFF.

7. An optical filter switching apparatus as claimed in claim 6, wherein the elastic retainer comprises a return spring, one end of the return spring being supported on a first support projection provided in the second plate, to which the rotary solenoid is secured, and the other end being supported on a second support projection formed on the first rotary lever.

8. An optical filter switching apparatus as claimed in claim 7, wherein if one of forward current and reverse current is applied, the rotary solenoid is rotated to the first position, and if the other of the forward current and reverse current is applied, the rotary solenoid is rotated to the second position.

9. An optical filter switching apparatus as claimed in claim 7, wherein if one of forward current and reverse current is applied, the rotary solenoid is rotated to the second position and if no current is applied, the rotary solenoid is returned to the first position.

10. An optical filter switching apparatus as claimed in claim 4, wherein the stopper comprises:
 a first stopping member having first and second rotary lever stopping projections provided on a second plate secured to the first plate to restrict the movement of the first rotary lever; or
 a second stopping member having a rotation restriction projection formed on the optical filter holding section, and first and second stopping projections provided on the first plate to restrict the movement of the rotation restriction projection of the optical filter holding section.

11. An optical filter switching apparatus for switching low pass optical filters for use in an optical instrument for converting externally input image information into video image information and outputting the video image information, wherein the apparatus comprises:

an optical filter holding section for holding a first optical filter for transmitting at least light of a first wavelength band in the image information and a second optical filter for transmitting light of a second wavelength band in the image information;

an actuator having a rotary solenoid which rotates between a first position for retaining the optical filter holding section at a first optical filter setting position so that the first filter is positioned in the path of the image information and a second position for retaining the optical filter holding section at a second optical filter setting position so that the second filter is positioned in the path of the image information, and a rotational power transmission section located between a shaft of the rotary solenoid and the optical filter holding section to transmit the rotational force of the rotary solenoid to the optical filter holding section;

a microprocessor for controlling the rotary solenoid of the actuator in accordance with at least one of an input signal which is externally input and a power level of the video image information, so that the rotary solenoid is rotated to at least one of the first and second positions; and a position sensing section which is capable of sensing the position of the optical filter holding section in real time by sensing an intensity of a magnetic field generated by the rotary solenoid.

12. An optical filter switching apparatus as claimed in claim 11, wherein the position sensing section comprises a hall switch provided on the bobbin of the rotary solenoid.

13. An optical filter switching apparatus as claimed in claim 12, wherein the hall switch comprises:

a hall sensor generating voltage in accordance with the intensity of the magnetic field generated from the rotary solenoid;

an amplifier for amplifying the voltage generated from the hall sensor;

a reference voltage generation section for outputting reference voltage by a control signal from the microprocessor; and a comparator for generating a signal for announcing the position of the optical filter holding section, on the basis of comparison between the voltage amplified by the amplifier and the reference voltage outputted from the reference voltage generation section.

* * * * *